United States Patent [19]

Izumitani et al.

[11] Patent Number: 5,866,256

[45] Date of Patent: *Feb. 2, 1999

[54] MOLDED ARTICLE OF FIBER-REINFORCED THERMOPLASTIC RESIN, PROCESS FOR PRODUCING THE SAME, AND LONG-FIBER-REINFORCED THERMOPLASTIC RESIN COMPOSITE

[75] Inventors: Tatsuo Izumitani, Nagano; Haruji Murakami, Shizuoka, both of Japan

[73] Assignee: Daicel Chemical Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 587,504

[22] Filed: Jan. 17, 1996

[30] Foreign Application Priority Data

Jan. 31, 1995 [JP] Japan .................................. 7-014272

[51] Int. Cl.$^6$ ...................................................... D02G 3/00
[52] U.S. Cl. ........................... 428/401; 428/357; 428/364; 428/372
[58] Field of Search ............................ 525/240; 428/372, 428/401, 357, 364; 524/505

[56] References Cited

U.S. PATENT DOCUMENTS 4,820,763  4/1989  Yang ........................................ 524/505
5,250,604  10/1993  Moriwaki et al. ....................... 524/494
5,468,807  11/1995  Tsurutani et al. ....................... 525/240

OTHER PUBLICATIONS

R. L. Fullman, "Measurement of Particle Sizes in Opaque Bodies", *Journal of Metals*, Mar. 1953, pp. 447–452.

JP–A–03 167 256 (Kishimoto Sangyo KK) Abstract dated Jul. 19, 1991.

JP–A–04 284 304 (Shinetsupolymer CO) Abstract dated Oct. 8, 1992.

JP–A–04 209 657 (Minoru Sangyo KK) Abstract dated Jul. 31, 1992.

*Primary Examiner*—Richard Weisberger

[57] ABSTRACT

To impart excellent heat-resisting characteristics, mechanical properties, etc., to a blend of resins having poor compatibility with each other, such as a blend of a crystalline thermoplastic resin with an amorphous thermoplastic resin.

A fiber-reinforced thermoplastic resin molding which comprises (A) a crystalline thermoplastic resin, (B) an amorphous thermoplastic resin (B1) and/or a crystalline thermoplastic resin (B2) incompatible with the component (A), and (C) 1 to 80% by weight (based on the whole composition) of a fibrous reinforcement having a number-average fiber length of at least 50 times as long as the average domain period.

15 Claims, 1 Drawing Sheet

MOLDED ARTICLE OF FIBER-REINFORCED THERMOPLASTIC RESIN, PROCESS FOR PRODUCING THE SAME, AND LONG-FIBER-REINFORCED THERMOPLASTIC RESIN COMPOSITE

[FIELD OF THE INVENTION]

The present invention relates to a fiber-reinforced thermoplastic resin molding made from a composition containing a thermoplastic resin blend and a fibrous reinforcement and excellent in heat resistance, mechanical properties, etc. Also, the present invention relates to a process for producing the same and a long-fiber-reinforced thermoplastic resin structure which enables an efficient production of the same.

[DESCRIPTION OF RELATED ART]

Various blends of thermoplastic resins have been attempted for taking advantage of the respective merits of the individual resins and complementing their demerits. However, the extent of improvement largely depends on whether or not the blended resins are compatible with each other (hereinafter referred to as "resin compatibility"), and a blend of resins having different compatibility properties is likely to have properties far lower than anticipated. For example, it has been a practice to blend a crystalline thermoplastic resin which has high heat resistance and excellent mechanical properties but has problems with flow characteristics, deformation shrinkage, cost and the like with a general-purpose amorphous thermoplastic resin having unsatisfactory properties or a general-purpose crystalline thermoplastic resin incompatible with the above crystalline thermoplastic resin. Even when the resins are blended in a volume ratio of 1:1, however, the properties of the general-purpose resin of inferior properties are predominant of the blend. In particular, with respect to the heat resistance, it is often that the blend exhibits only a low heat distortion temperature (HDT) or a deflection temperature under load (DTUL). Moreover, in the region of the blend composition close to the above volume ratio of 1:1, the heat distortion temperature or mechanical properties are largely affected by a slight blend composition change, so that it is difficult to carry out a stable product supply.

This predominance of the properties of the general-purpose resin which is inferior in properties is also observed in the reinforcement of the blend resin with a fibrous reinforcement such as glass fibers. The improvement of the rigidity and the like by the action of the incorporated fibers can be anticipated but the improvement of the heat resistance such as heat distortion temperature thereby would be very slight and would not be satisfactory at all. Further, compounding the blend resin with a fibrous reinforcement or the like would often sacrifice the impact resistance of the blend resin.

[SUMMARY OF THE INVENTION]

The task to be attained by the present invention is to impart, for example, excellent heat resistance and mechanical properties to the blend of resins having a poor compatibility with each other, such as a blend of a crystalline thermoplastic resin and an amorphous thermoplastic resin.

The inventors have found that the reinforcement of a thermoplastic resin blend with long fibers enables the blend to exhibit excellent heat resistance even at a volume ratio close to 1:1. The present invention has been made on the basis of this finding.

Namely, the present invention relates to a molded article of a fiber-reinforced thermoplastic resin comprising:
(A) a crystalline thermoplastic resin,
(B) an amorphous thermoplastic resin (B1) and/or a crystalline thermoplastic resin (B2) incompatible with the component (A), and
(C) 1 to 80% by weight (based on the whole composition) of a fibrous reinforcement or reinforcing filaments of fiber,
the fibrous reinforcement (C) having a number-average fiber length of at least 50 times as long as the average domain period.

The invention provides a process for producing a molded article of a fiber-reinforced thermoplastic resin by melting and molding or plasticizing a long-fiber-reinforced thermoplastic resin composite or structure having a length of at least 3 mm and comprising:
(A) a crystalline thermoplastic resin,
(B) an amorphous thermoplastic resin (B1) and/or a crystalline thermoplastic resin (B2) incompatible with the component (A), and
(C) 1 to 80% by weight (based on the entire composite or composition) of a fibrous reinforcement,
the fibrous reinforcement (C) being substantially as long as the structure and being arranged in parallel to one another at the longitudinal direction of the composite.

The invention provides a long-fiber-reinforced thermoplastic resin composite or structure having a length of at least 3 mm and comprising:
(A) a crystalline thermoplastic resin,
(B) an amorphous thermoplastic resin (B1) and/or a crystalline thermoplastic resin (B2) incompatible with the component (A), and
(C) 1 to 80% by weight (based on the whole composite or composition) of a fibrous reinforcement,
the fibrous reinforcement (C) being substantially as long as the structure and being arranged in parallel to one another at the longitudinal direction of the structure.

The constitution and the function of the present invention will now be described in detail.

As mentioned above, generally, engineering plastics are excellent in heat resistance, chemical resistance and mechanical properties but often have problems with flow property, deformation shrinkage, cost and the like. On the contrary, general-purpose plastics are available at a low cost but often have unsatisfactory properties. Although blending of thermoplastic resins is known as one means for mutually complementing the properties of the above two types of plastics, the obtained properties are frequently far lower than anticipated depending on the compatibility of the resins in melt blending. For example, with respect to a blend of a crystalline thermoplastic resin and an amorphous thermoplastic resin, the distortion under load accompanied by temperature rise (heat distortion temperature: HDT) first occurs at the glass transition temperature (Tg) of the amorphous thermoplastic resin and, when the temperature is further raised, the crystalline thermoplastic resin is melted to result in the distortion of the whole body. The extent of distortion at each temperature is governed by, for example, the resin molecular weights, volume ratio of the blend, and compatibility. More specifically, the greater the molecular weight, the higher the melt viscosity, accordingly the extent of distortion at a given temperature and a given time is reduced. The resin volume ratio of the blend defines the morphology of the molding and, when the blend ratio deviates from unity, the minor constituent resin phases form islands while the major constituent resin phases form a sea. On the other hand, when the blend ratio is close to 1:1, the resins form a continuous double-phase structure. When the sea-island phase structure is realized, the heat resistance of the blend approaches that of the resin constituting the sea. On the other hand, when the two resins form the continuous double-phase structure, a rapid change in the properties occurs from that of one of the constituent resins to that of the other. The extent of this change depends on the compatibility between the resins constituting the blend. When this compatibility is good, an additivity holds between the respective properties of the constituent resins, so that the properties of the blend smoothly change in accordance with the blend ratio to thereby approach those intermediate between the individual resins.

On the other hand, when the compatibility is poor, what is known as the S-shaped change is exhibited in which the properties of the major component predominate at a deviated blend ratio while they are rapidly changed at a blend ratio close to 1:1. The compatibility is poor in many of the common blends of a crystalline thermoplastic resin and an amorphous thermoplastic resin, in which, even when the volume ratio of the blend is 1:1, the properties of the amorphous thermoplastic resin are often so predominant as to exhibit only low heat resistance. It is a common practice to reinforce this type of thermoplastic resin blend with fibers of, for example, glass. However, the reinforcement with short glass fibers according to the common extrusion process enables the thermoplastic resin blend to have improved rigidity and strength but its impact resistance is rather lowered by the reinforcement. Moreover, although a rise of the heat distortion temperature attributed to the lowering of the flow property at about Tg of the amorphous thermoplastic resin is recognized with respect to the heat resistance, the extent of the temperature rise is several to 10 degrees Celsius at the best.

Now the inventors have found that the molding obtained by reinforcing the blend of a crystalline thermoplastic resin and a amorphous thermoplastic resin or the blend of a crystalline thermoplastic resin and a thermoplastic resin incompatible therewith with a fibrous reinforcement of a specified length has strikingly improved heat resistance. Further, the inventors have found a process for producing the above molding and a long-fiber-reinforced thermoplastic resin structure which can efficiently serve this purpose. The present invention has been made on the basis of these findings.

Examples of the crystalline thermoplastic resin (A) suitable for use in the present invention include polypropylene, polyethylene, polyethylene terephthalate, polybutylene terephthalate, nylon, polyoxymethylene and polyphenylene sulfide, which however do not limit the scope of the suitable crystalline thermoplastic resin (A). When a member of these crystalline thermoplastic resins is selected as component (A), one incompatible with the resin selected as component (A) is selected as other crystalline thermoplastic resin (B2).

Examples of the amorphous thermoplastic resin (B1) include polystyrene, styrene/acrylonitrile copolymer, ABS resin, polycarbonate and polymethyl methacrylate.

In the present invention, the above component (B1) and/or component (B2) is used as component (B).

It is preferred that the volume ratio (A/B) of component (A) to component (B) range from 10/90 to 90/10 and especially from 10/90 to 70/30. When the volume ratio is in the above range, the effect of the present invention is especially remarkable.

Examples of the fibrous reinforcement suitable for use as component (C) include glass, Aramid, stainless steel and carbon fibers, and their types are not particularly limited. However, it is requisite that the fibrous reinforcement have a number-average fiber length of at least 50 times as long as the resin's average domain period observed under an electron microscope or the like. The above-mentioned excellent effect is exerted by maintaining this fiber length in the molding. The number-average fiber length can be determined by removing the resin component from the molding by, for example, burning it at 600° C., separating remaining fibers from around the center part of the molding, dispersing the separated fibers in water, and measuring the fiber lengths through a stereomicroscope, followed by the division of the sum thereof by the number of the fibers.

The above fibrous reinforcement (C) is compounded in the molding or structure of the present invention in an amount of 1 to 80% by weight (based on the whole composition). When the amount of the fibrous reinforcement (C) is less than 1% by weight, no effect of the present invention can be exerted. On the other hand, when it exceeds 80% by weight, preparation of the molding or structure is extremely difficult. It is preferred that the fibrous reinforcement (C) be compounded in an amount of 5 to 70% by weight and especially 10 to 60% by weight.

When the domain size is 10 $\mu$m or above, the domain period is measured through an ordinary optical microscope. However, when the sea-island structure contrast is low, use may be made of a phase-contrast microscope or a polarization microscope. On the other hand, when the domain size is smaller than 10 $\mu$m, it is generally difficult to observe the domain period through an optical microscope and use is made of an electron microscope. Scanning and transmission electron microscopes are used as representative electron microscopes. In the observation through an electron microscope, it is needed to provide a specimen with a contrast for electron beams. That is, for the observation through a scanning electron microscope, the specimen's observation surface is etched with a suitable solvent capable of selectively dissolving one of the resins. On the other hand, for the observation through a transmission electron microscope, one of the resins is selectively stained with a heavy metal. Osmic acid is often used as the selective staining agent for polymers having double bonds, while ruthenic acid is often effectively used for polymers having benzene rings, such as polystyrene. Further, polymers having amide groups, such as nylon, are effectively stained with phosphotungstic acid. The average domain period is measured by the obtained photomicrograph. That is, a scale is moved from the top of the photomicrograph toward the lower part thereof with the minimum unit defined as the island-island distance being the smallest in the photomicrograph or, in the case of the resin having a continuous double-phase structure, the distance between the shortest phase and another phase, and scanning lines are drawn at equal intervals in the direction perpendicular to the direction of advance of the scale. The average domain period $l_{lab}$ with respect to one scanning line is determined by the method based on the following formula described in R. E. Fullman. Trans. Metals Soc. AIME, 197, 447 (1953):

$$l_{lab} = L/(P/2)$$

wherein P is the number of intersections at which an interface trace line and a scanning line cross each other and L is the sum of intersection-intersection distances obtained in either of the phases. This scanning is conducted for all the scanning lines, and the resultant average is taken as the average domain period. This sequence of operations can be efficiently executed by the use of the computer image analysis technology which has made rapid progress in recent years.

The reason for the improvement in heat resistance of the blend resin composition attained by the reinforcement thereof with long fibers is interpreted as relating to the phenomenon wherein phases composed of the crystalline thermoplastic resin are connected to each other and immobilized by the long fibers to thereby cause the rise of apparent heat distortion temperature. Thus, this phenomenon is believed to be characteristic of the molding obtained by reinforcing with long fibers a blend of polymers incompatible with each other, at least one of which contains a crystalline polymer. Further, a mechanical property improvement is anticipated over that of a molding reinforced with short fibers. Still further, similar effects can be anticipated with the use of a low-melting crystalline polymer/ high-melting crystalline polymer blend. Examples of the high-melting crystalline polymer include polyethylene terephthalate, polybutylene terephthalate, nylon, polyoxymethylene and polyphenylene sulfide. Examples of the low-melting crystalline polymer include polyethylene, polypropylene and poly-ε-caprolactone.

The above fiber-reinforced thermoplastic resin molding according to the present invention, i.e., the molding in which the fibrous reinforcement (C) has a number-average fiber length of at least 50 times as long as the average domain period can be obtained by, for example, the following processes. Naturally, the fiber-reinforced thermoplastic resin molding according to the present invention is not limited to those obtained by the described processes.

Available Processes:

(1) a process which comprises impregnating a fibrous reinforcement (C) with a molten resin composed of a blend of component (A) and component (B) according to the pultrusion method to prepare a long-fiber-reinforced thermoplastic resin structure of at least 3 mm in length and melt plasticizing the structure to effect molding;

(2) a process which comprises impregnating a fibrous reinforcement (C) with a molten resin of component (A) to prepare a long-fiber-reinforced thermoplastic resin structure of at least 3 mm in length and with a molten resin of component (B) to prepare another long-fiber-reinforced thermoplastic resin structure of at least 3 mm in length both according to the pultrusion method, blending the obtained structures, and melt plasticizing the blend to effect molding;

(3) a process which comprises impregnating a fibrous reinforcement (C) with a molten resin of either component (A) or component (B) according to the pultrusion method to prepare a long-fiber-reinforced thermoplastic resin structure of at least 3 mm in length blending the obtained structure with another component, i.e., either component (B) or component (A), and melt plasticizing the blend to effect molding; and (4) a process which comprises blending components (A), (B) and (C) together and melt plasticizing and milling the blend under a mild shear-stress condition so as to prevent grave rupture of the fibrous reinforcement (C) and effect molding.

Of the above processes for producing the fiber-reinforced thermoplastic resin molding according to the present invention, processes (1) to (3) are preferred and process (1) is especially preferred.

The above processes facilitate holding of the fibers having specified fiber lengths in the molding and realize excellent dispersion of the resin components to thereby exert superior effects.

The pultrusion processes fundamentally carry out resin impregnation while drawing continuous fibers. Known pultrusion processes include one in which fibers are passed through an impregnation bath containing a resin emulsion, suspension, solution or melt to thereby effect resin impregnation, another one in which either a powdery resin is blown on fibers or fibers are passed through a vessel containing a powdery resin to thereby attach the powdery resin to the fibers, followed by melting of the resin to thereby effect resin impregnation, and still another one in which a resin is fed toward a cross head die from an extruder or the like while passing fibers through the die to thereby effect resin impregnation. Among them, the process using a cross head die is particular preferable preparation process for the above-described long-fiber-reinforced thermoplastic resin structure because it can provide preparing the components except the fibrous reinforcement at desired ratio and mixing and kneading homogeneously.

The form of the obtained long-fiber-reinforced resin structure of the present invention is not particularly limited. It can be endowed with the form of a rod, a tape, a sheet and various modified cross-section continuous-lengths. Generally, the long-fiber-reinforced resin structure is cut into appropriate lengths before forming or use. Especially, it is preferred that the long-fiber-reinforced resin be made into pellets each of 3 to 100 mm in length. Various conventional molding techniques can be easily employed to form the resultant long-fiber-reinforced resin structure into a fiber-reinforced thermoplastic resin molded article of the present invention.

Further, any of the conventional substances generally added to thermoplastic resins, for example, a stabilizer such as an antioxidant, a heat stabilizer or an ultraviolet absorber, an antistatic agent, a flame retarder, a flame retardant auxiliary, a colorant such as a dye or a pigment, a lubricant, a slip additive, a plasticizer, a mold releasing agent, a crystallization promoter and a nucleating agent can be compounded in the fiber-reinforced thermoplastic resin molded article or the long-fiber-reinforced thermoplastic resin structure of the present invention within the range of amount not seriously detrimental to the object and effect thereof for imparting desired properties in accordance with the object. Still further, any of various conventional short fibers and platy or particulate inorganic compounds such as glass flake, mica, glass bead, talc, clay, alumina, carbon black and wollastonite can be added thereto in an appropriate amount.

[EXAMPLES]

Figure 1:
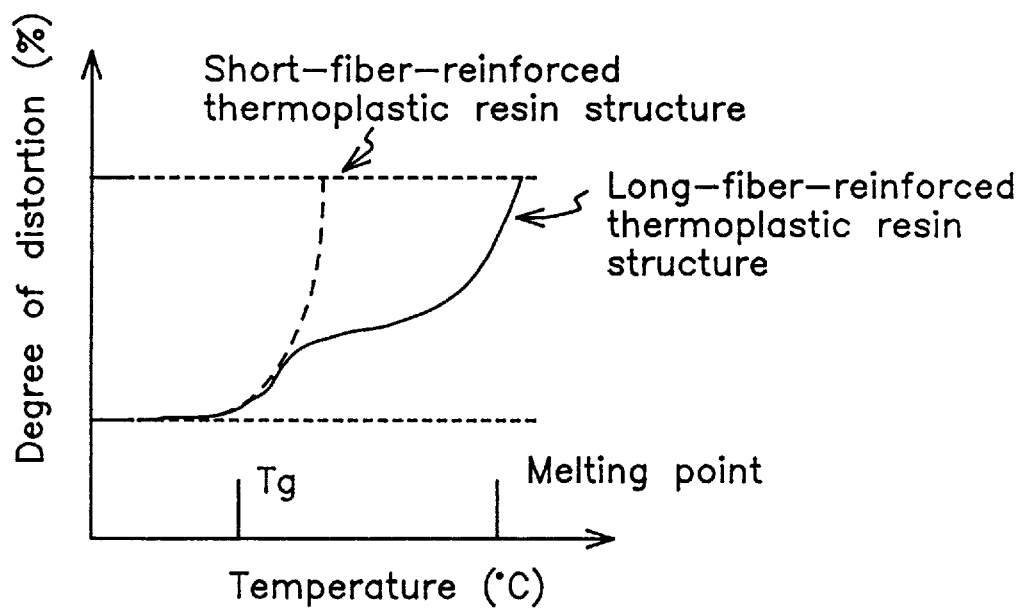
FIG. 1 is a graph showing a curve of degree of distortion vs. temperature obtained by measuring the heat distortion temperature in Example 1 and Comparative Example 1.

The present invention will now be described with reference to the following Examples, which in no way limit the scope of the invention.

Example 1

A thermoplastic resin structure (pellet) reinforced with 9-mm long glass fibers and having a glass content of 50% by weight was produced through pultrusion by opening continuous glass fiber bundles (roving), passing the fibers through an impregnation die by pulling to impregnate the fibers with a molten resin fed to the impregnation die, followed by shaping, cooling and cutting. Pellets (heat distortion temperature: 100° C.) obtained by melt kneading a 50:50 (% by weight) blend of nylon 6 and ABS resin were melted and used as the above impregnation resin. In the obtained structure (pellet), each glass fiber was as long as the pellet and the glass fibers were arranged substantially in parallel in the longitudinal direction of the pellet.

Subsequently, the above thermoplastic resin structure (pellet) reinforced with long glass fibers and those obtained by diluting it with the above 50:50 (% by weight) blend of nylon 6 and ABS resin to a glass content of 30 or 10% by weight were individually injection molded into test pieces, which were used for the evaluation of the properties. The mechanical properties and heat distortion temperatures are given in Table 1.

An ultrathin section was prepared from the resin pellets before reinforcement with fibers, stained with phosphotungstic acid and observed through a transmission electron microscope to inspect the resin phase morphology. The two resin phases constituted a continuous double phase whose average domain period was 12 μm.

The test piece (molding) was burned and the glass fiber length within the test piece was measured. The number-average fiber length was found to be 2.8 mm.

A curve of degree of distortion vs. temperature obtained by measuring the heat distortion temperature of the test piece with a glass content of 30% by weight is shown in FIG. 1.

TABLE 1

| Fiber | Glass content wt % | Tensile strength kgf/cm² | Flexural strength kgf/cm² | Flexural modulus kgf/cm² | Izod impact strength kg · cm/cm | Heat distortion temp. (°C.) |
|---|---|---|---|---|---|---|
| long fiber | 50 | 1890 | 2240 | 115000 | 29 | 210 |
| long fiber | 30 | 1500 | 1950 | 73200 | 30 | 201 |
| long fiber | 10 | 823 | 1180 | 33900 | 19 | 153 |

Comparative Example 1

Pellets (heat distortion temperature: 100° C.) obtained by melt kneading a 50:50 (% by weight) blend of nylon 6 and ABS resin were blended with short glass fibers (each 6 mm). The blend was melt kneaded and extruded by means of an extruder. Thus, two types of pellets of thermoplastic resins reinforced with short glass fibers having glass contents of 30 and 10% by weight respectively were produced. It was difficult to produce pellets having a glass content as high as 50% by weight. Test pieces were prepared and evaluated in the same manner as in Example 1. The results are given in Table 2.

The average domain period was 12 μm in this instance, and the number-average fiber length within the test piece (molding) was 2.8 mm.

A curve of degree of distortion vs. temperature obtained by measuring the heat distortion temperature of the test piece with a glass content of 30% by weight is shown in FIG. 1.

TABLE 2

| Fiber | Glass content wt % | Tensile strength kgf/cm² | Flexural strength kgf/cm² | Flexural modulus kgf/cm² | Izod impact strength kg · cm/cm | Heat distortion temp. (°C.) |
|---|---|---|---|---|---|---|
| short fiber | 30 | 1170 | 1770 | 67900 | 16 | 178 |
| short fiber | 10 | 627 | 1040 | 32400 | 11 | 104 |

Example 2

A thermoplastic resin structure (pellet) reinforced with long glass fibers was produced in the same manner as in Example 1 except that the resin was replaced by pellets (heat distortion temperature: 90° C.) obtained by melt kneading a 50:50 (% by weight) blend of polybutylene terephthalate resin and ABS resin, injection molded, and evaluated for the properties.

The mechanical properties and heat distortion temperatures are given in Table 3.

An ultrathin section was prepared from the resin pellets before reinforcement with fibers, stained with ruthenic acid, and observed through a transmission electron microscope to inspect the resin phase morphology. The average domain period was 8 μm.

The number-average fiber length within the test piece (molding) was 3.2 mm.

TABLE 3

| Fiber | Glass content wt % | Tensile strength kgf/cm² | Flexural strength kgf/cm² | Flexural modulus kgf/cm² | Izod impact strength kg · cm/cm | Heat distortion temp. (°C.) |
|---|---|---|---|---|---|---|
| long fiber | 50 | 1580 | 1860 | 115000 | 15 | 204 |
| long fiber | 30 | 1260 | 1730 | 80100 | 17 | 200 |
| long fiber | 10 | 744 | 1070 | 37900 | 9.6 | 152 |

Comparative Example 2

Pellets of a thermoplastic resin reinforced with short glass fibers was produced in the same manner as in Comparative Example 1 except that use was made of pellets (heat distortion temperature: 90° C.) obtained by melt kneading a 50:50 (% by weight) blend of polybutylene terephthalate resin and ABS resin, molded, and evaluated for the properties.

The mechanical properties and heat distortion temperatures are given in Table 4.

The average domain period was 8 μm in this instance, and the number-average fiber length within the test piece (molding) was 0.2 mm.

TABLE 4

| Fiber | Glass content wt % | Tensile strength kgf/cm² | Flexural strength kgf/cm² | Flexural modulus kgf/cm² | Izod impact strength kg · cm/cm | Heat distortion temp. (°C.) |
|---|---|---|---|---|---|---|
| short fiber | 30 | 1170 | 1670 | 76300 | 8.7 | 172 |
| short fiber | 10 | 635 | 1010 | 35700 | 5.4 | 106 |

Comparative Example 3

(Example of Amorphous Resin/Crystalline Resin Blend)

A thermoplastic resin structure (pellet) reinforced with long glass fibers was produced in the same manner as in Example 1 except that use was made of pellets (heat distortion temperature: 115° C.) obtained by melt kneading a 50:50 (% by weight) blend of polycarbonate resin and ABS resin, molded, and evaluated for the properties. Further, pellets reinforced with short fibers and having a glass content of 30% by weight were produced in the same manner as in Comparative Example 1, molded, and evaluated for the properties.

Their mechanical properties and heat distortion temperatures are given in Table 5.

The average domain period in either instance was found to be 8.5 μm by the observation through a transmission electron microscope according to the ruthenic acid staining technique. Further, the number-average fiber length within the test piece (molding) was 2.9 mm in the use of the long-fiber-reinforced thermoplastic resin structure (pellet) and 0.3 mm in the use of the short-fiber-reinforced pellets.

As apparent from the above, the contribution of the employment of long fibers to the rise of heat distortion temperature was extremely small in the blend of amorphous resins.

TABLE 5

| Fiber | Glass content wt % | Tensile strength kgf/cm$^2$ | Flexural strength kgf/cm$^2$ | Flexural modulus kgf/cm$^2$ | Izod impact strength kg · cm/cm | Heat distortion temp. (°C.) |
|---|---|---|---|---|---|---|
| long fiber | 50 | 1630 | 1610 | 105000 | 14 | 131 |
| long fiber | 30 | 1390 | 1640 | 72900 | 16 | 128 |
| long fiber | 10 | 936 | 1290 | 40900 | 14 | 120 |
| short fiber | 30 | 1260 | 1540 | 67500 | 9.2 | 121 |

We claim:

1. A molded article of a fiber-reinforced thermoplastic resin composite structure having a complex form of a matrix and domains comprising:
   (1) a matrix comprising a blend of at least two resins:
      (A) a crystalline thermoplastic resin, and
      (B) an amorphous thermoplastic resin (B1) and/or a crystalline thermoplastic resin (B2) which is inherently incompatible with the resin (A), and
   (2) a fibrous reinforcement,
      (C) which is 1 to 80% by weight (based on the weight of the entire composite)
   wherein (i) the volume ratio of the resin (A) to the resin (B) is 10/90 to 90/10, said resins (A) and (B) being inherently incompatible with each other, and
   (ii) the fibrous reinforcement (C) has a number-average fiber length of at least 50 times as long as the average distance between two domains.

2. A long-fiber-reinforced thermoplastic resin composite structure having a matrix and domains and having a length of at least 3 mm and comprising:
   (A) a crystalline thermoplastic resin,
   (B) an amorphous thermoplastic resin (B1) and/or a crystalline thermoplastic resin (B2) inherently incompatible with the resin (A), the volume ratio of (A) to (B) being 10/90 to 90/10, and
   (C) 1 to 80% by weight (based on the whole composition) of a fibrous reinforcement, said
   fibrous reinforcement (C) being substantially as long as the structure and being arranged in parallel in the longitudinal direction of the structure.

3. The composite structure as claimed in claim 2, comprising pellets obtained by melt-kneading the thermoplastic resins (A) and (B) and having a length of 3 to 100 mm.

4. The composite structure as claimed in claim 1, wherein components (A) and (B) are selected from those resins which will form a domain structure when they are blended with each other.

5. The molded article of claim 1, wherein the volume ratio of resin (A) to resin composition (B) is from 10/90 to 70/30.

6. The resin composite structure of claim 2, wherein the volume ratio of (A) to (B) is from 10/90 to 70/30.

7. The molded article of claim 1, wherein the fibrous reinforcement (C) is present in an amount of 5 to 70% by weight.

8. The molded article of claim 7, wherein the fibrous reinforcement (C) is present in an amount of 10 to 60% by weight.

9. The resin composite structure of claim 2, wherein the fibrous reinforcement (C) is compounded in an amount of 5 to 70% by weight.

10. The resin composite structure of claim 9, wherein the fibrous reinforcement (C) is present in an amount of 10 to 60% by weight.

11. The molded article of claim 1, wherein the crystalline thermoplastic resin (A) is a member selected from the group consisting of polypropylene, polyethylene, polyethylene terephthalate, polybutylene terephthalate, nylon, polyoxymethylene and polyphenylene sulfide.

12. The molded article of claim 1, wherein the amorphous thermoplastic resin (B1) is a member selected from the group consisting of polystyrene, styrene/acrylonitrile copolymer, ABS resin, polycarbonate and polymethyl methacrylate.

13. The molded article of claim 1, wherein the fibrous reinforcement (C) is a member selected from the group consisting of glass, Aramid, stainless steel and carbon fibers.

14. The molded article according to claim 1, wherein the crystalline thermoplastic resin (A) comprises nylon, and the amorphous thermoplastic resin (B1) comprises ABS resin.

15. The molded article according to claim 14, wherein the fibrous reinforcement (C) comprises glass fibers.

* * * * *